United States Patent
Chan et al.

(10) Patent No.: US 6,871,291 B2
(45) Date of Patent: Mar. 22, 2005

(54) METHOD FOR RECORDING POWER FAILURE TIME OF A COMPUTER SYSTEM

(75) Inventors: Sen-Ta Chan, Taipei Hsien (TW); Yi-Chang Wu, Taipei Hsien (TW); Yi-Hsun Chen, Taipei Hsien (TW)

(73) Assignee: Wistron Corporation, Hsi-Chih (TW)

( * ) Notice: Subject to any disclaimer, the term of this patent is extended or adjusted under 35 U.S.C. 154(b) by 578 days.

(21) Appl. No.: 09/683,576

(22) Filed: Jan. 22, 2002

(65) Prior Publication Data

US 2003/0140259 A1 Jul. 24, 2003

(51) Int. Cl.$^7$ ................................................ G06F 1/32
(52) U.S. Cl. ...................... 713/340; 713/300; 713/330; 365/226; 365/228
(58) Field of Search ................................ 713/300, 330, 713/340; 365/226, 228

(56) References Cited

U.S. PATENT DOCUMENTS 4,375,663 A * 3/1983 Arcara et al. ............... 365/226
6,574,062 B1 * 6/2003 Bennett et al. .............. 360/69

* cited by examiner

*Primary Examiner*—Rehana Perveen
(74) *Attorney, Agent, or Firm*—Winston Hsu

(57) ABSTRACT

A method for recording power failure time of a computer system. The computer system includes a power supply for generating a power signal, a memory for recording data, and a processor for processing data. The processor has a power port connected to the power supply for receiving the power signal, an input port for receiving a power good signal, and an output port connected to the memory for outputting the power failure time of the computer system to the memory. The recording method includes writing a power failure time and a check number into the memory when the input port of the processor does not receive the power good signal, and when the power signal has dropped below a threshold voltage.

20 Claims, 3 Drawing Sheets

METHOD FOR RECORDING POWER FAILURE TIME OF A COMPUTER SYSTEM

BACKGROUND OF INVENTION

1. Field of the Invention

The present invention relates to a method for recording power failure time of a computer system. Specifically, the present invention teaches a method for recording a power failure time of a computer system into non-volatile memory.

2. Description of the Prior Art

The loss of power of a computer system can severely cripple the productivity of a computer user. Not only can the user lose any unsaved work, there is also a lengthy period of time needed for the user to reboot the computer. Thus, computer network system administrators have an interest in tracking power loss events for the computers on their network. By examining statistical information on the exact time that computers lose power, system administrators can help to avoid such incidents in the future.

The prior art method for recording a time of a computer power failure event involves using a time recording device installed in the computer for calculating the exact time in which power is lost. This time is then stored in some sort of non-volatile memory for later use. The prior art time recording device continuously updates the latest time that the computer has received power. During normal operation of the computer, the time recording device constantly updates the latest operating time of the computer. When a power failure does occur, the last time stored by the time recording device is then recognized as the approximate time of the power failure.

However, the prior art method for recording the time of the computer power failure event uses a considerable amount of computer resources due to the constant updating of the last operating time of the computer. The prior art method time recorder will even update the recorded time when a normal, steady flow of power is received. Since most of the time the quality of power supplied to computers is considered acceptable, the continued updating of the time recorder wastes computer resources that could otherwise be used for other operations of the computer.

SUMMARY OF INVENTION

It is therefore a primary objective of the claimed invention to provide a method for recording a power failure time of a computer system only when a loss of power is detected.

According to the claimed invention, the computer system comprises a power supply for generating a power signal, a memory for recording data, and a processor for processing data. The processor has a power port connected to the power supply for receiving the power signal, an input port for receiving a power good signal, and an output port connected to the memory for outputting the power failure time of the computer system to the memory. The recording method includes writing a power failure time and a check number into the memory when the input port of the processor does not receive the power good signal, and when the power signal has dropped below a threshold voltage.

It is an advantage of the claimed invention that the method records the time of the power loss only when a loss of power is detected. For accomplishing the time recording, the method uses computer resources only when necessary. Thus, better system performance is obtained in order to overcome the prior art shortcomings.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
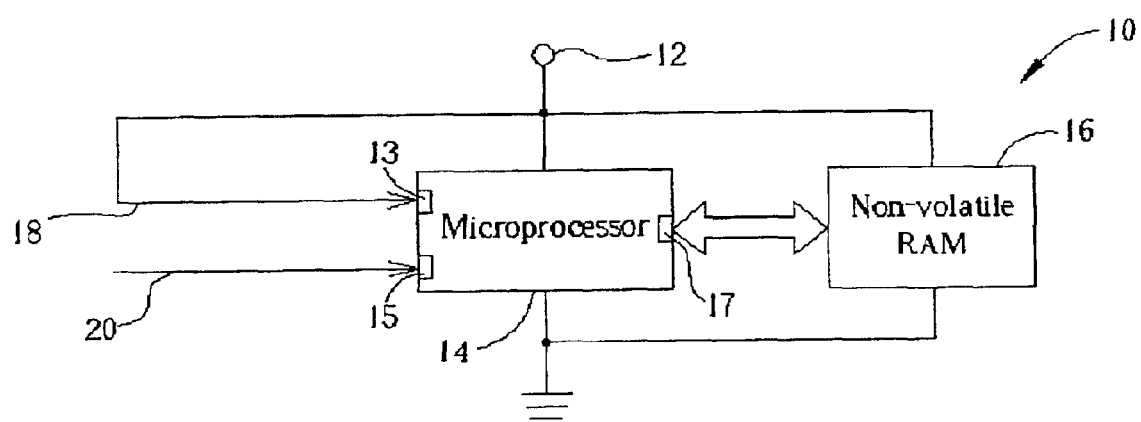
FIG. 1 is a simplified functional diagram of a computer system according to the present invention.

Please refer to FIG. 1 of a simplified functional diagram of a computer system 10 according to the present invention. The computer system 10 comprises a power supply 12 for providing power to the computer system 10, a first memory 16 in the form of non-volatile random access memory (RAM) for recording data, and a microprocessor 14 for processing data. The microprocessor 14 receives a standby power signal 18 at its first input port 13. In addition, the microprocessor 14 has a second input port 15 for receiving a power good signal 20, and an output port 17 connected to the first memory 16 for outputting a power failure time and a checksum based on this time to the first memory 16. A real-time clock (RTC) generated by a processor, a south bridge, or another part of the computer system 10 can be used to keep track of the time for the computer system 10. The power good signal 20 is an indication of the purity of the power signal 18 received by the microprocessor 14, and is preferably produced by another logic circuit. If the power signal 18 meets specifications, the power good signal 20 has a value of 1. Once power is interrupted, the power good signal 20 then changes to a value of 0.

Figure 2:
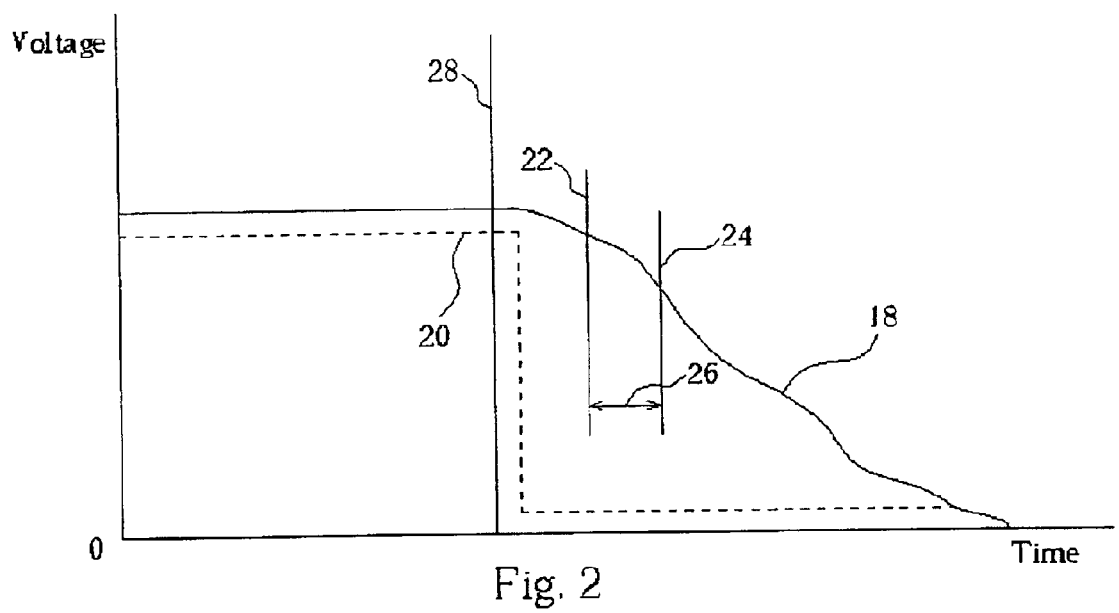
FIG. 2 is a diagram illustrating events related to a loss of power according to the present invention.

Please refer to FIG. 2. FIG. 2 is a diagram illustrating events related to a loss of power according to the present invention. Voltage values of the power signal 18 are shown both before and after a loss of power 28. Notice that before the loss of power 28, the power good signal 20 has a value of 1 and the power signal 18 is normal and steady. Then, immediately after the loss of power 28, the voltage level of the power signal 18 begins to fall. After a short delay, the logic circuit that produces the power good signal 20 detects the loss of power 28. Accordingly, the power good signal 20 is dropped to a value of 0. Since the loss of power 28 has occurred, the computer system 10 must decide if the power failure time should be recorded into the first memory 16.

Since very minor fluctuations in power are common, the present invention computer system 10 only records the power failure time for significant power failures that could become total power losses. This is accomplished by comparing the current voltage of the power signal 18 to a threshold voltage 22 level. If the value of the power signal 18 is above the threshold voltage 22, the computer system 10 does not need to record the time of the power failure since it is likely that the power failure is only small and temporary. However, if the value of the power signal 18 falls below that of the threshold voltage 22, then the computer system 10 must record the time of the power failure since the total loss of power could happen soon. When this significant power loss has been detected, the microprocessor 14 has a fixed amount of time 26 in which to record the failure time. The microprocessor 14 must write the failure time into the first memory 16 before the power signal 18 reaches a lowest operational voltage 24 of the microprocessor 14, which is below the threshold voltage 22. Doing so ensures that the accurate power failure time is recorded in the first memory 16.

Along with the failure time, the checksum is also written to the first memory 16 whenever the power signal 18 is below the threshold voltage 22. If the power failure was not a serious failure, and the computer continues to operate, the computer system 10 will clear the checksum from the first memory 16. In this way, the checksum helps to denote a complete power failure, and not a temporary power fluctuation.

Figure 3:
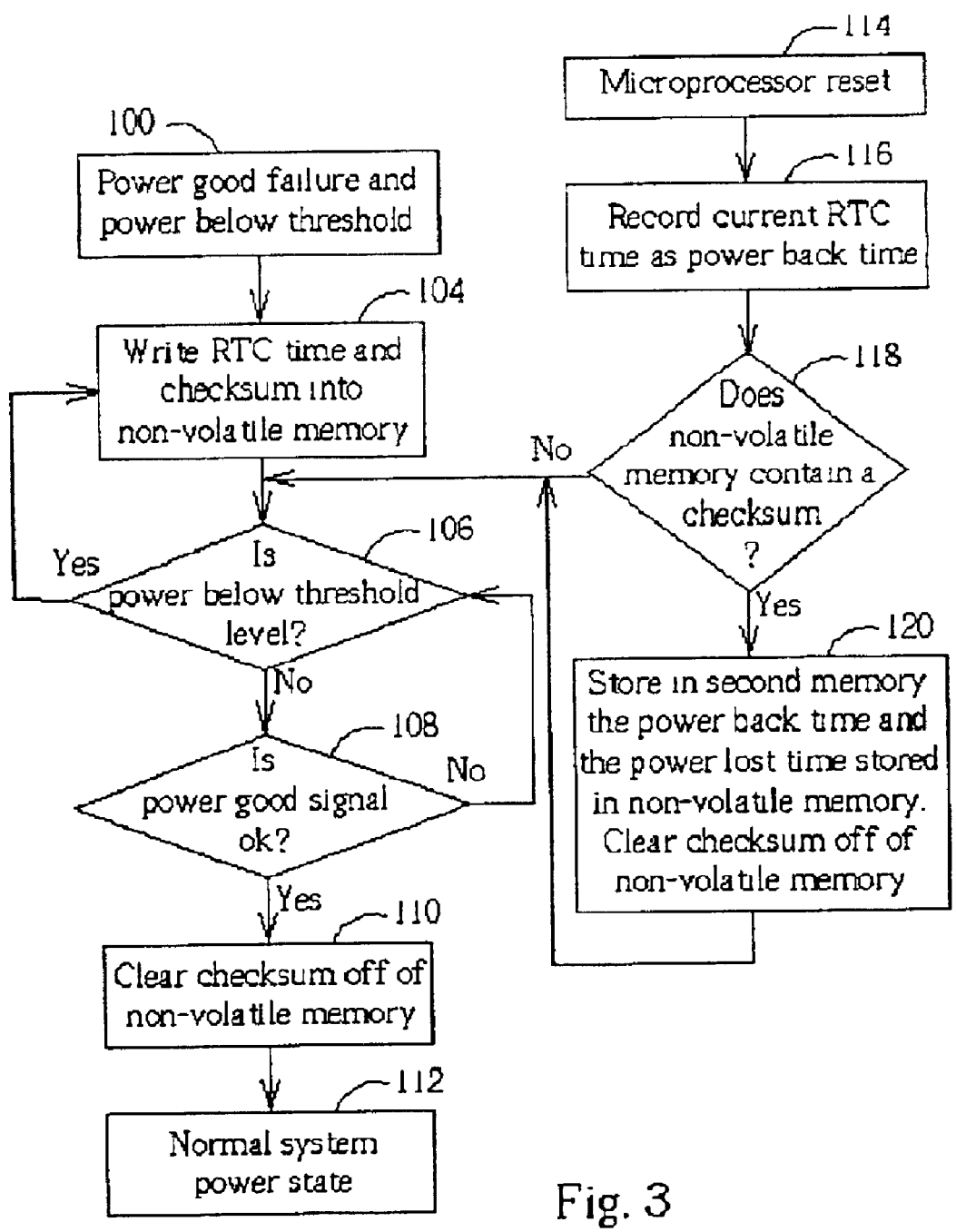
FIG. 3 is a flowchart illustrating actions that are taken by the computer system during the loss of power.

Please refer to FIG. 3. FIG. 3 is a flowchart illustrating actions that are taken by the computer system 10 during the loss of power. As shown, either a failure of the power good signal 20 or a microprocessor reset event will cause the computer system 10 to take appropriate action for recording the power failure time.

step 100: Power good failure and power signal 18 is below the threshold voltage 22;

step 104: Write the RTC time and corresponding checksum into the first memory 16; step 106: If the power signal 18 is below the threshold voltage 22, go to step 104. If not, go to step 108;

step 108: If the power good signal 20 has a value of 1, continue to step 110; If the power good signal 20 has a value of 0, go to step 106;

step 110: No power loss detected. Clear the checksum off of the first memory 16 if the checksum is present;

step 112: Normal system power state;

step 114: Microprocessor is reset;

step 116: Record the current RTC time as a power back time;

step 118: If the first memory 16 contains a checksum, go to step 120. If not, go to step 106;

step 120: Store in a second memory the power back time and the power lost time that is stored in the first memory 16. Clear the checksum off of the first memory 16. Go to step 106.

As can be seen from step 120, the power failure time and power back time are only recorded in the second memory after a microprocessor reset event that was caused by power failure. The second memory can be any form of memory that allows the system administrator to keep track of all power failure times and power back times. This information can be stored to a hard drive, to a network drive, or other memory types. The way that the computer system 10 distinguishes between the loss of power and the computer user properly shutting down the computer is through the use of the checksum as shown in step 118. The checksum will only be stored in the first memory 16 when loss of power has occurred. If the checksum is not present, then no times need to be recorded in the second memory. For extra caution, after the microprocessor reset event, the computer system 10 checks the quality of the power signal 18 again by executing step 106 of the flowchart. Any further problems with the quality of the power signal 18 will be dealt with as before.

As shown in steps 104 and 106 of the flowchart, the method for recording the power failure time has the ability to repeatedly update the last operating time of the computer system 10. This scenario would be most useful if the power signal 18 was below the threshold voltage 22, yet still high enough to power the microprocessor 14. By repeatedly recording the updated time into the first memory 16, the most accurate time of the power failure can be determined.

In contrast to the prior art, the present invention method for recording the power failure time of the computer system 10 uses the resources of the computer system 10 only when a power failure is detected. Since the method does not require the use of computer resources when an adequate power signal 18 is received, better overall system performance is achieved.

Those skilled in the art will readily observe that numerous modifications and alterations may be made while retaining the teachings of the invention. Accordingly, the above disclosure should be construed as limited only by the metes and bounds of the appended claims.

What is claimed is:

1. A method for recording power failure time of a computer system, the computer system comprising:

a power supply for generating a power signal;

a first memory for recording data; and a processor for processing data comprising:

a power port connected to the power supply for receiving the power signal;

an input port for receiving a power good signal; and an output port connected to the first memory for outputting the power failure time of the computer system to the first memory;

the method comprising following step:

(a) when the input port of the processor does not receive the power good signal, and the power signal has dropped below a threshold voltage, then the processor writes a first power failure time and a first check number into the first memory, the first check number being calculated by using the first power failure time.

2. The method of claim 1 wherein the memory is a non-volatile RAM (random access memory).

3. The method of claim 1 wherein the first power failure time and the first check number are written into the first memory before the power signal drops to a minimum operation voltage of the processor, the threshold voltage being above the minimum operation voltage.

4. The method of claim 1 further comprising following step:

(b) if the power good signal is still not received, and the power signal is still below the threshold voltage, then the processor writes a second power failure time and a second check number into the first memory, the second check number being calculated by using the second power failure time.

5. The method of claim 1 further comprising following step:

(c) after the processor is reset, the power failure time corresponding to a selected check number is read out from the first memory in the memory and is written into a second memory.

6. The method of claim 1 further comprising following step:

(d) writing a power back time into a second memory after the processor is reset.

7. The method of claim 6 wherein the power failure time and the power back time are written according to a real time clock (RTC).

8. The method of claim 7 wherein the real time clock is provided by a component selected from a group consisting of a processor and a south bridge.

9. The method of claim 1 wherein the power signal is a standby power signal.

10. The method of claim 1 wherein the computer system further comprises a logic circuit for generating the power good signal, the input port of the processor being connected to the logic circuit for receiving the power good signal.

11. A computer system comprising:

a power supply for generating a power signal;

a first memory for recording data; and a processor for processing data comprising:

a power port connected to the power supply for receiving the power signal;

an input port for receiving a power good signal; and an output port connected to the first memory for outputting the power failure time of the computer system to the first memory;

wherein when the input port of the processor does not receive the power good signal, and the power signal has dropped below a threshold voltage, then the processor writes a first power failure time and a first check number into the first memory, the first check number being calculated by using the first power failure time.

12. The computer system of claim 11 wherein the memory is a non-volatile RAM (random access memory).

13. The computer system of claim 11 wherein the first power failure time and the first check number are written into the first memory before the power signal drops to a minimum operation voltage of the processor, the threshold voltage being above the minimum operation voltage.

14. The computer system of claim 11 wherein if the power good signal is still not received, and the power signal is still below the threshold voltage, then the processor writes a second power failure time and a second check number into the first memory, the second check number being calculated by using the second power failure time.

15. The computer system of claim 11 wherein after the processor is reset, the power failure time corresponding to a selected check number is read out from the first memory in the memory and is written into a second memory.

16. The computer system of claim 11 wherein after the processor is reset, a power back time is written into a second memory.

17. The computer system of claim 16 wherein the power failure time and the power back time are written according to a real time clock (RTC).

18. The computer system of claim 17 wherein the real time clock is provided by a component selected from a group consisting of a processor and a south bridge.

19. The computer system of claim 11 wherein the power signal is a standby power signal.

20. The computer system of claim 11 further comprising a logic circuit for generating the power good signal, the input port of the processor being connected to the logic circuit for receiving the power good signal.

* * * * *